(12) United States Patent  (10) Patent No.: US 7,128,445 B1
Karkay  (45) Date of Patent: Oct. 31, 2006

(54) ORNAMENTAL LAMP ASSEMBLY

(75) Inventor: Avi A. Karkay, 6705 Single Tree La., Oak Park, CA (US) 91377

(73) Assignee: Avi A. Karkay, Oak-Park, CA (US)

( * ) Notice: Subject to any disclaimer, the term of this patent is extended or adjusted under 35 U.S.C. 154(b) by 85 days.

(21) Appl. No.: 11/072,804

(22) Filed: Mar. 3, 2005

(51) Int. Cl.
F21V 13/02 (2006.01)

(52) U.S. Cl. .................. 362/343; 362/304; 362/806

(58) Field of Classification Search ............... 362/174, 362/188, 257, 293, 304, 319, 343, 475, 510, 362/512, 514, 516, 519, 520, 560, 800, 806, 362/811
See application file for complete search history.

(56) References Cited

U.S. PATENT DOCUMENTS 3,463,118 A    8/1969   Woods
3,515,459 A    6/1970   Woods
5,816,686 A *  10/1998  Wang et al. ............ 362/653
6,312,137 B1 * 11/2001  Hsieh ..................... 362/96
6,312,142 B1   11/2001  Dorsa
6,854,863 B1 *  2/2005  Wu ........................ 362/292
6,958,869 B1 * 10/2005  Monastiere ............. 359/819
7,066,636 B1 *  6/2006  Wu ........................ 362/654

* cited by examiner

Primary Examiner—Thomas M. Sember
Assistant Examiner—Adam C. Rehm

(57) ABSTRACT

An ornamental lamp assembly which mounts a diffraction grating in the form of a compact disc about a light socket. The diffraction grating is mounted so as to freely wobble relative to the light socket. A light bulb mounted in the light socket produces light that is reflected by the refraction grating which visually produces a series of different colors that are constantly moving due to the wobbling mounting of the grating on the light socket. The compact disc could include a series of light reflective areas and a series of light transmitting areas.

7 Claims, 4 Drawing Sheets

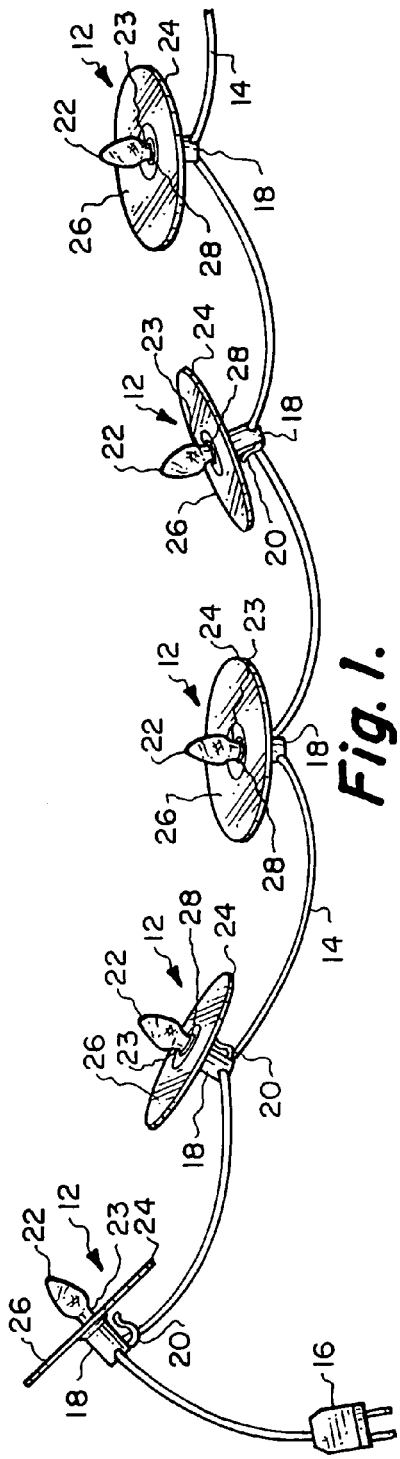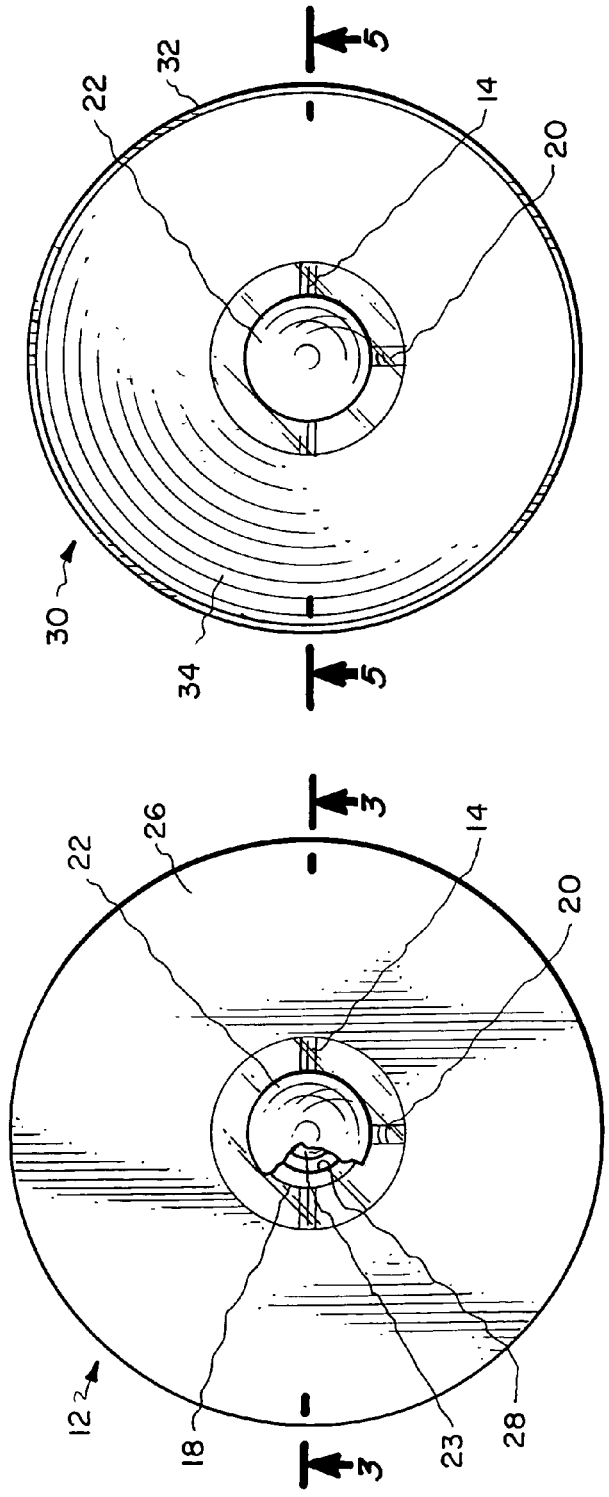

ORNAMENTAL LAMP ASSEMBLY

BACKGROUND OF THE INVENTION

1. Field of the Invention

The field of this invention relates to ornamental lamp assemblies that utilizes a compact disc as a diffraction grating so that light from a light bulb can be reflected by the diffraction grating producing a myriad of different colors with the colors constantly changing.

2. Description of the Related Art

It is known that optically a diffraction grating consists of a regular series of fine lines ruled on a reflective surface of glass, plastic or metal. A type of structure that can be used as a diffraction grating is a compact disc. Compact discs have a continuous surface that can function as a light reflective surface with this continuous surface to have formed therein a concentric arrangement of a mass of grooves. Typical compact discs are CDs, DVDs, laser discs, mini discs and the like.

When light is reflected off the light reflective surface of a compact disc, different colors are produced. These colors are different shades of reds, blues, yellows, orange and greens. The appearance of these colors produces a desirable visual effect to an observer. When a light bulb is mounted in close proximity to the disc and when viewed in the direction of the light reflective surface, the reflected light produces a most desirable visual, colorful effect. Compact discs are commonly used for their data storage capacity. However, because of the construction of the compact disc, the compact disc also could be used as a light reflective, diffraction grating.

In the past, the using of a compact disc in conjunction with a light bulb socket has been known. However, the diffraction grating of the prior art has been fixedly mounted to the compact disc. It has been discovered that if the compact disc was to be permitted to freely wobble a limited amount that the produced colorful pattern is constantly changed thereby producing a much enhanced visual effect.

SUMMARY OF THE INVENTION

The basic embodiment of the present invention is directed to a light bulb socket which has a light bulb mounted therein. A sheet material, light reflective, diffraction grating has a center hole and also a light reflective surface. The light bulb socket is located in alignment in the center hole with the light reflective surface located directly adjacent the light bulb. The grating is mounted to be capable of limited free wobbling movement. Light that is emitted from the light bulb is reflected from the light reflective surface creating a most desirable visual effect comprising a series of different colored reflections which move about due to the wobbling mounting of the light diffraction grating. A further embodiment of the present invention is where the basic embodiment is modified by defining that the sheet material, light reflective, diffraction grating is disc shaped.

A further embodiment of the present invention is where the just previous embodiment is modified by defining that the sheet material, light reflective, diffraction grating comprises a compact disc.

A further embodiment of the present invention is where the basic embodiment is modified by defining that the center hole is oversized relative to the light bulb base thereby creating a loose fit mounting.

A further embodiment of the present invention is where the basic embodiment is modified by defining that the diffraction grating is constructed of sheet material.

A further embodiment of the present invention is where the just previous embodiment is modified by defining that the diffraction grating is bowl shaped.

A further embodiment of the present invention is where the basic embodiment is modified by stating that the diffraction grating is constructed of a series of light reflective areas and a series of light transmitting areas.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an isometric view of a portion of a chain of lights which include a plurality of the ornamental assemblies of the present invention;

FIG. 2 is a top plan view of the ornamental lamp assembly of the present invention looking directly down on the light bulb;

FIG. 4 is a top plan view similar to FIG. 2 but of a modified form of ornamental lamp socket of the present invention;

DETAILED DESCRIPTION OF THE INVENTION

Figure 3:
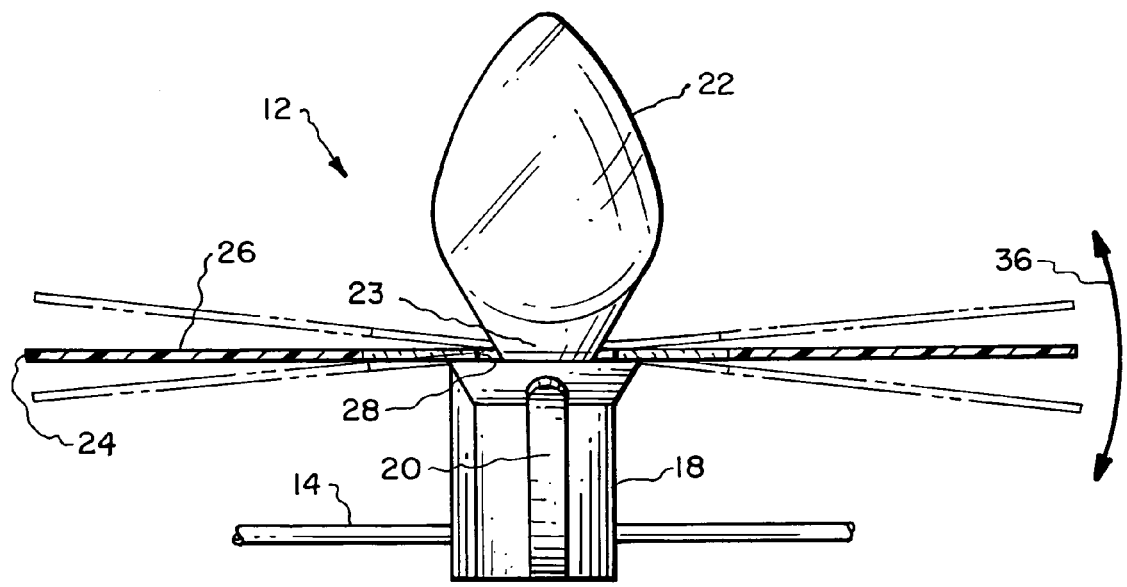
FIG. 3 is a cross-sectional view taken through line 3—3 of FIG. 2.

Referring particularly to FIG. 1, there is shown a light string 10 which is composed of a plurality of ornamental lamp assemblies 12 which are electrically connected together by electrical wire 14. One end of the electrical wire 14 terminates in a plug 16 which is to be used to connect to a source of electricity, which is not shown. Each of the ornamental lamp assemblies 12 are identical and there are only shown five of the lamp assemblies 12. Although in actual practice, the light string 10 will include far more than five in number of the lamp assemblies 12.

Each ornamental lamp assembly 12 includes a bulb socket 18. Conventionally, there is usually attached to the bulb socket 18 a clip 20. The clip 20 is designed to facilitate attachment to an exterior structure, which is not shown. The use of such clips is exceedingly common and ordinary in conjunction with conventional bulb sockets 18.

Mounted within the bulb socket 18 is a light bulb 22. The light bulb 22 is shown to be of an incandescent type bulb. The light bulb has a narrow base 23 to which is attached the main portion of the light bulb 23. However, it is considered to be within the scope of this invention that other kinds of light bulbs could be used. Typically, the bulb socket 18 and the clip 20 are fabricated of a plastic material.

A compact disc 24 which has a light reflective surface 26 and a center hole 28 is mounted in conjunction with the bulb socket 18 and the light bulb 22. The compact disc 24 is retained in position between the body of the light bulb 22 and the bulb socket 18, as is clearly shown in FIG. 3 of the drawings. It is to be noted that the center hole 28 is oversized, and where the light bulb 22 is necked down compared to the body of the bulb 22 forming base 23, that is where the center hole 28 is located and surrounds that portion of the bulb 22. Because of the oversized center hole 28, the compact disc 24 assumes a loose fit so that the compact disc 24 is free to wobble between the dotted line positions shown in FIG. 3. This wobbling produces a constant changing appearance when the bulb 22 is illuminated. This constant changing appearance are different colors of red, blue yellow, orange and green that become apparent to the observer. This is caused by the light reflecting off the light reflective surface 26 with the light constantly reflecting at different angles because of the wobbling nature of the compact disc 24. When using of the light string 10 in an outdoor environment, as for example at Christmas time, and where the light string 10 is mounted on a structure, such as a house or on a tree, the wind will cause each of the compact discs 24 to wobble and this wobbling produces an extremely attractive appearance with the constant changing panorama of color.

Figure 5:
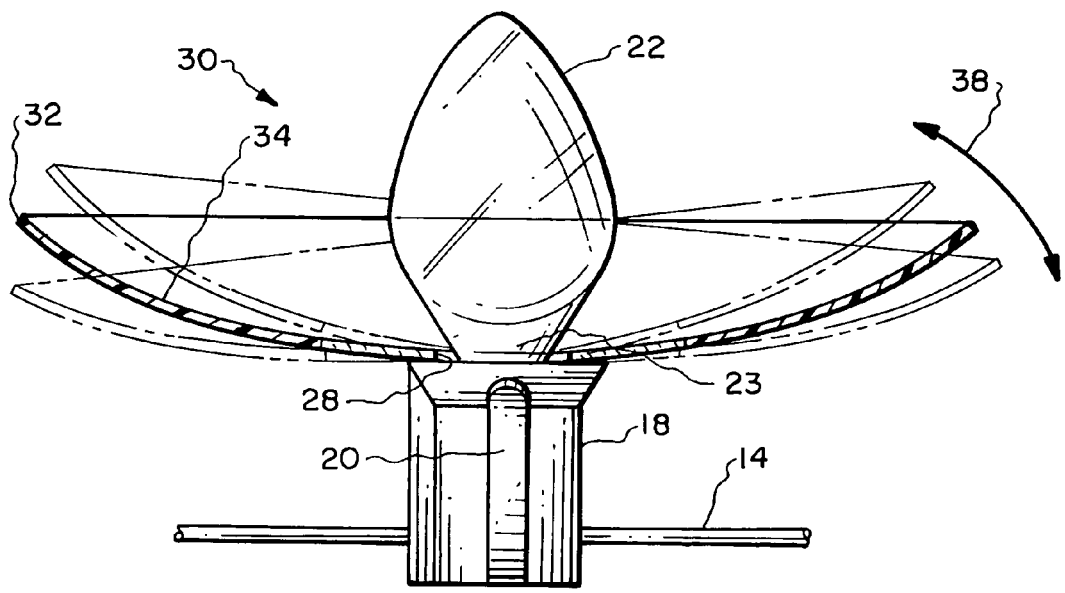
FIG. 5 is a transverse cross-sectional view taken along line 5—5 of FIG. 4.

Referring particularly to FIGS. 4 and 5 of the drawings, there is shown a modified form 30 of ornamental lamp assembly. Similar reference numbers for similar parts relative to FIGS. 2 and 3 have been included within FIGS. 4 and 5. The light diffraction grating 32, which has a light reflective surface 34, is formed basically arcuate or bowl shaped. For a clear showing of the bowl shape configuration, note particularly FIG. 5. The grating 32, again because of the over-sized hole 28, is free to wobble with respect to the body of the light bulb 22 and the socket 18. This wobbling is permitted by means of the oversized hole 28 so there is no tight fit in the mounting of the compact disc 24 relative to the bulb 22 and the socket 18. The wobbling motion is depicted generally by means of arrow 36 in FIG. 3 and by means of arrow 38 in FIG. 5. Again, the wobbling motion is to be caused by an extraneous force such as wind. The compact disc 24 and grating 32 are both constructed to include a concentric series of grooves formed within the light reflective surfaces 26 and 34 which is common in construction of such discs 24. It is those concentric series of grooves that diffracts the light and produces the myriad of different colors when the light is reflected from the bulb 22. It is to be noted that the light reflective surfaces 26 and 34 are located directly adjacent the body of the light bulb 22.

Figure 6:
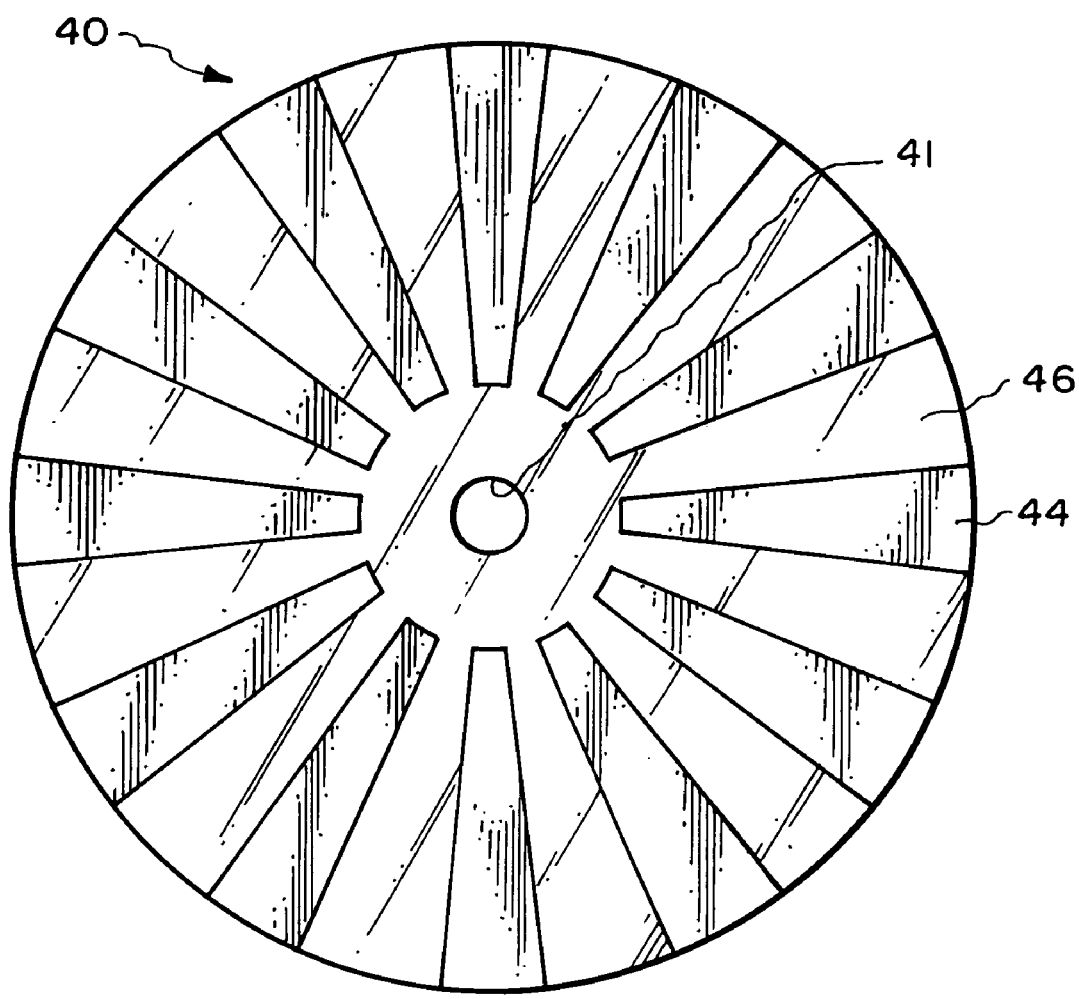
FIG. 6 is a plan view of a first modified form of compact disc.
Figure 7:
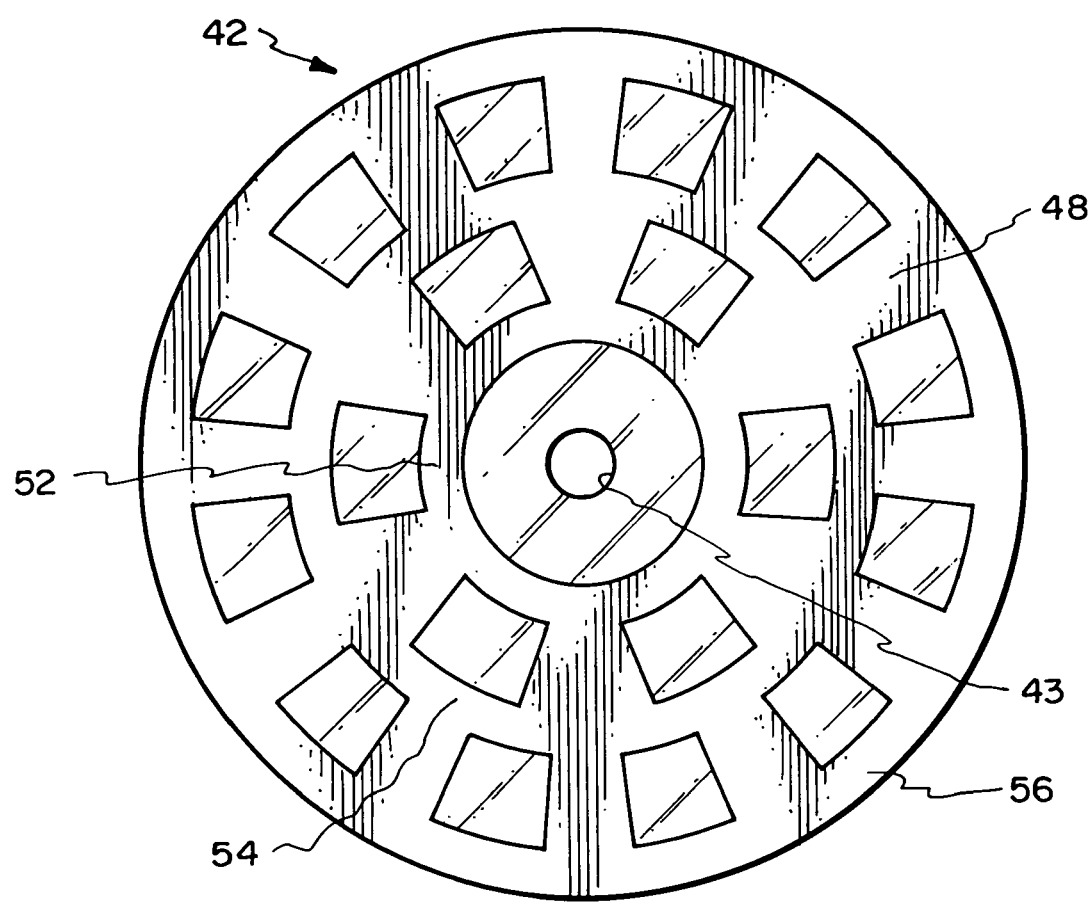
FIG. 7 is a plan view of a second modified form of compact disc.

Referring particularly to FIGS. 6 and 7, there is shown respectively a first modified form 40 of compact disc and a second modified form of compact disc 42. Form 40 has an oversized center hole 41 and form 42 has an oversized center hole 43. Forms 40 and 42 are constructed similar to compact disc 24 except form 40 has a series of light reflective (opaque) areas 44 and a series of light transmitting (transparent) areas 46. An area 46 is located between each directly adjacent pair of areas 44. Areas 44 and 46 are each basically in the shape of a truncated cone. However, other shapes could be used, such as spiral shapes. In FIG. 7, the disc 42 could be divided into a series of small block shaped reflective areas 48 and a series of transparent areas 50. There is also a series of spaced apart, concentric rings 52, 54 and 56 of light reflective areas with ring 52 being smallest and ring 56 being largest. The transparent areas 46 and 50 permit the light to shine rearwardly of the forms 40 and 42 of compact discs so the light could be viewed from any direction (360°).

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An ornamental lamp assembly comprising:
   a light bulb socket having a light bulb mounted therein;
   a sheet material, light reflective, diffraction grating having a center hole, said diffraction grating having a light reflective surface, said light bulb socket located directly adjacent said center hole with said light reflective surface located directly adjacent said light bulb, said grating being mounted relative to said light bulb socket having limited free wobbling movement, where light that is emitted from said light bulb is reflected from said light reflective surface creating a visual effect comprising a series of different colored reflections which move about due to the wobbling mounting of said light diffraction grating of said ornamental lamp assembly.

2. The ornamental lamp assembly as defined in claim 1 wherein:
   said light diffraction grating being disc shaped.

3. The ornamental lamp assembly as defined in claim 2 wherein:
   said light diffraction grating comprising a compact disc.

4. The ornamental lamp assembly as defined in claim 1 wherein:
   said center hole being oversized to create a loose mounting relative to said light bulb socket.

5. The ornamental lamp assembly as defined in claim 1 wherein:
   said diffraction grating being of sheet material.

6. The ornamental lamp assembly as defined in claim 5 wherein:
   said diffraction grating being bowl shaped.

7. The ornamental lamp assembly as defined in claim 1 wherein:
   said diffraction grating being constructed of a series of light reflective areas and a series of light transmitting areas.

\* \* \* \* \*